(12) United States Patent
Springer

(10) Patent No.: US 7,681,919 B2
(45) Date of Patent: Mar. 23, 2010

(54) DIFFUSER PLATE FOR CONNECTING A RIGID STRUCTURE TO A FLEXIBLE STRUCTURE AND MACHINE USING SAME

(75) Inventor: Steven Springer, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 328 days.

(21) Appl. No.: 11/731,598

(22) Filed: Mar. 30, 2007

(65) Prior Publication Data

US 2008/0238064 A1 Oct. 2, 2008

(51) Int. Cl.
*B62D 21/00* (2006.01)
*B62D 24/00* (2006.01)

(52) U.S. Cl. .................. 280/781; 280/756; 180/311; 180/89.1; 172/776

(58) Field of Classification Search ............ 280/756, 280/781; 180/89.1, 311, 418; 296/29, 30, 296/102, 190.03, 190.08, 193.12; 172/776
See application file for complete search history.

(56) References Cited

U.S. PATENT DOCUMENTS

| | | | |
|---|---|---|---|
| 2,843,231 A * | 7/1958 | Maruhn | 403/187 |
| 4,098,350 A * | 7/1978 | Eftefield | 172/776 |
| 4,134,507 A | 1/1979 | Piercy et al. | |
| 5,159,882 A | 11/1992 | Krug et al. | |
| 5,388,884 A | 2/1995 | Keehner et al. | |
| 5,529,342 A | 6/1996 | Mast et al. | |
| 5,586,784 A | 12/1996 | Mast et al. | |
| 5,630,622 A | 5/1997 | Kirschenmann et al. | |
| 5,636,867 A | 6/1997 | McNabb et al. | |
| 6,199,894 B1 * | 3/2001 | Anderson | 280/638 |
| 6,213,507 B1 | 4/2001 | Ramsey et al. | |
| 6,325,449 B1 | 12/2001 | Sorensen et al. | |
| 6,485,084 B2 | 11/2002 | Sorensen et al. | |
| 6,631,942 B1 * | 10/2003 | Kitagawa | 296/187.1 |
| 6,990,757 B2 | 1/2006 | Takemura et al. | |
| 7,001,134 B2 | 2/2006 | Aoki et al. | |
| 2005/0218644 A1 * | 10/2005 | Fowler et al. | 280/781 |
| 2005/0252669 A1 * | 11/2005 | LaReau et al. | 172/776 |
| 2007/0256881 A1 * | 11/2007 | Ball et al. | 180/312 |
| 2008/0067836 A1 * | 3/2008 | Takano et al. | 296/193.12 |

* cited by examiner

*Primary Examiner*—Ruth Ilan
*Assistant Examiner*—Keith Frisby
(74) *Attorney, Agent, or Firm*—Liell & McNeil

(57) ABSTRACT

A machine having a ground engaging element includes a first rigid metallic structure, a second metallic structure that is flexible with respect to the first rigid metallic structure, and a diffuser plate having a stress carrying region located between a first end and a second end. The first end has a rigid attachment to the first metallic structure, and the second end has a rigid attachment to the second metallic structure. The stress carrying region is flexible with respect to the attachments. A stress produced from a flexing of the second metallic structure relative to the first metallic structure is concentrated within the stress carrying region of the diffuser plate instead of at a weld location.

19 Claims, 3 Drawing Sheets

DIFFUSER PLATE FOR CONNECTING A RIGID STRUCTURE TO A FLEXIBLE STRUCTURE AND MACHINE USING SAME

TECHNICAL FIELD

The present disclosure relates generally to connecting a rigid structure to a flexible structure with a diffuser plate, and more particularly to concentrating a stress produced from a flexing of the flexible structure relative to the rigid structure within a stress carrying region of the diffuser plate.

BACKGROUND

A rollover protection system (ROPS) of a machine, such as an articulated wheel loader, provides protection for an operator of the machine in the event of a rollover. The ROPS generally includes a two-post or four-post frame, or cab that is secured to the frame of the machine. If the machine is rolled over, resulting in a lateral force being applied to the ROPS, it is important for the force or load to be transferred from the ROPS to the frame of the machine. A robust connection must, therefore, exist between the ROPS and the frame in order to successfully transfer such a load.

In conventional assemblies, one or more support plates for mounting the ROPS are welded directly to a portion of the frame. These welded joints are subject to extreme stress, not just in the event of a rollover, but also during normal operation of the machine. As large loads are applied to the machine frame, any deflection or bending of the frame structure tends to occur at the joint connecting the ROPS plates to the frame. Extreme and/or cyclic stresses on these joints may ultimately lead to the development of fatigue cracks and possibly failure of these welds.

In an articulated machine, the ROPS plates are typically mounted to a rear frame assembly of the machine. The rear frame assembly supports an engine of the machine and is pivotally connected at an articulation joint to a front frame assembly. The front frame assembly is articulated with respect to the rear frame assembly by a pair of steering cylinders that are continually extended and retracted during a normal duty cycle of the machine. The large steering forces affecting each of the frame assemblies due to this continual movement result in repetitive flexing of the rear frame assembly with respect to the ROPS support plates mounted thereon. These cyclic stresses, concentrated at the joint connecting the rear frame assembly and the ROPS plates, may reduce the fatigue life and ultimately lead to failure of the welded joint.

To account for this, methods have been introduced to improve the strength and durability of such a welded joint. For example, U.S. Pat. No. 4,134,507 teaches annular fillet welds that connect a bracket to a flexing beam assembly. Specifically, the bracket includes first and second ends. The first end includes a round opening having a welded joint extending substantially around the periphery of the opening to connect the bracket to a lift arm of a loading vehicle. The second end of the bracket includes a load bearing connecting joint for pivotally connecting the bracket to the vehicle. The annular fillet welds are located along a low stress area of the lift arm and provide a means for transferring loads or forces to the low stress area. This reference does not, however contemplate concentrating or consuming the load within an intermediary piece that connects the bracket to the flexing beam assembly.

The present disclosure is directed to one or more of the problems set forth above.

SUMMARY OF THE INVENTION

In one aspect, a machine having a ground engaging element includes a first rigid metallic structure, a second metallic structure that is flexible with respect to the first rigid metallic structure, and a diffuser plate having a stress carrying region located between a first end and a second end. The first end has a rigid attachment to the first metallic structure, and the second end has a rigid attachment to the second metallic structure. The stress carrying region is flexible with respect to the attachments. A stress produced from a flexing of the second metallic structure relative to the first metallic structure is concentrated within the stress carrying region of the diffuser plate.

In another aspect, a method of assembling a machine includes a step of attaching a first end of a diffuser plate to a first rigid metallic structure at a rigid attachment. The method also includes a step of attaching a second end of the diffuser plate to a low stress area of a second metallic structure, which is flexible with respect to the first rigid metallic structure, at a rigid attachment. The diffuser plate includes a stress carrying region that is flexible with respect to the attachments, and is located between the first end and the second end for concentrating stress produced from a flexing of the second metallic structure relative to the first metallic structure.

In still another aspect, a frame assembly of a machine includes a box frame structure including at least two parallel plates. A support plate is disposed adjacent a top portion of the parallel plates and oriented perpendicularly thereto. At least one diffuser plate extends along a plane parallel to a plane of the two parallel plates. A first end of the diffuser plate has an attachment to the support plate and a second end of the diffuser plate has an attachment to the box frame structure.

DETAILED DESCRIPTION

Figure 1:
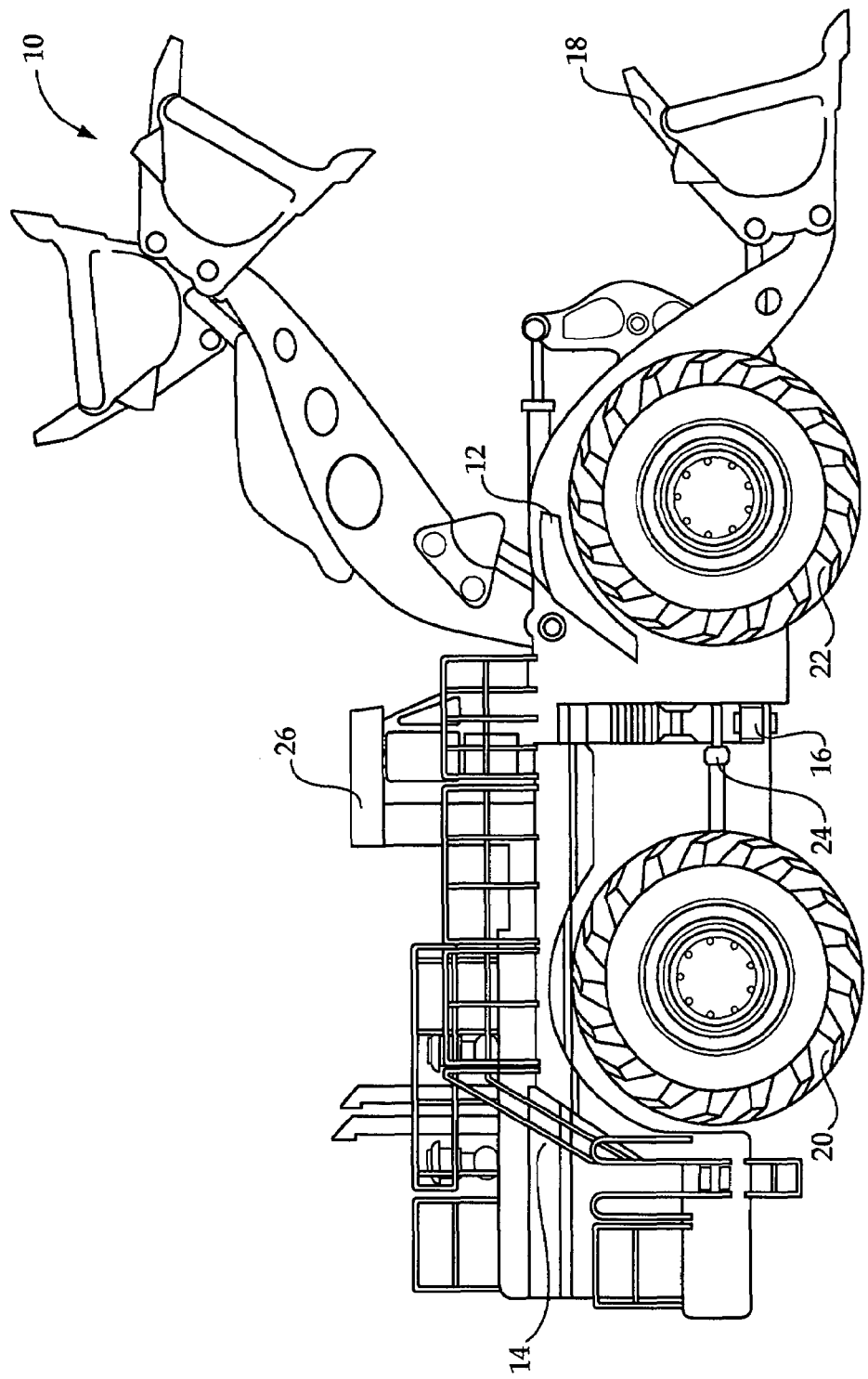
FIG. 1 is a side diagrammatic view of a machine according to the present disclosure.

An exemplary embodiment of a machine 10 is shown generally in FIG. 1. The machine 10 may be a wheel loader, or any other vehicle having a front frame assembly 12 pivotally connected to a rear frame assembly 14, or engine-end frame, at an articulation joint 16. The front frame assembly 12 is rotatable with respect to the rear frame assembly 14 and may provide support for an implement assembly, such as, for example, an implement assembly including a bucket 18. The rear frame assembly 14 may provide support for an engine and drivetrain system of the machine 10. The drivetrain system powers front and rear axle assemblies mounted on the respective front and rear frame assemblies 12 and 14. The front and rear axle assemblies rotate ground engaging elements, such as, for example, wheels 20 and 22.

Steering for the machine 10 is facilitated through the use of a pair of steering cylinders 24 (one shown). The steering cylinders 24 are connected to the front and rear frame assemblies 12 and 14 and extend and contract to articulate the front frame assembly with respect to the rear frame assembly, as is well known in the art.

An operator control station 26 of the machine 10 is built around a framework known in the art as a rollover protection system (ROPS). The ROPS generally includes horizontally extending structural members supported above the rear frame assembly 14 by a plurality of vertically extending posts. The posts, in turn, are typically secured by a resilient mounting arrangement to a portion of the rear frame assembly 14.

Figure 2:
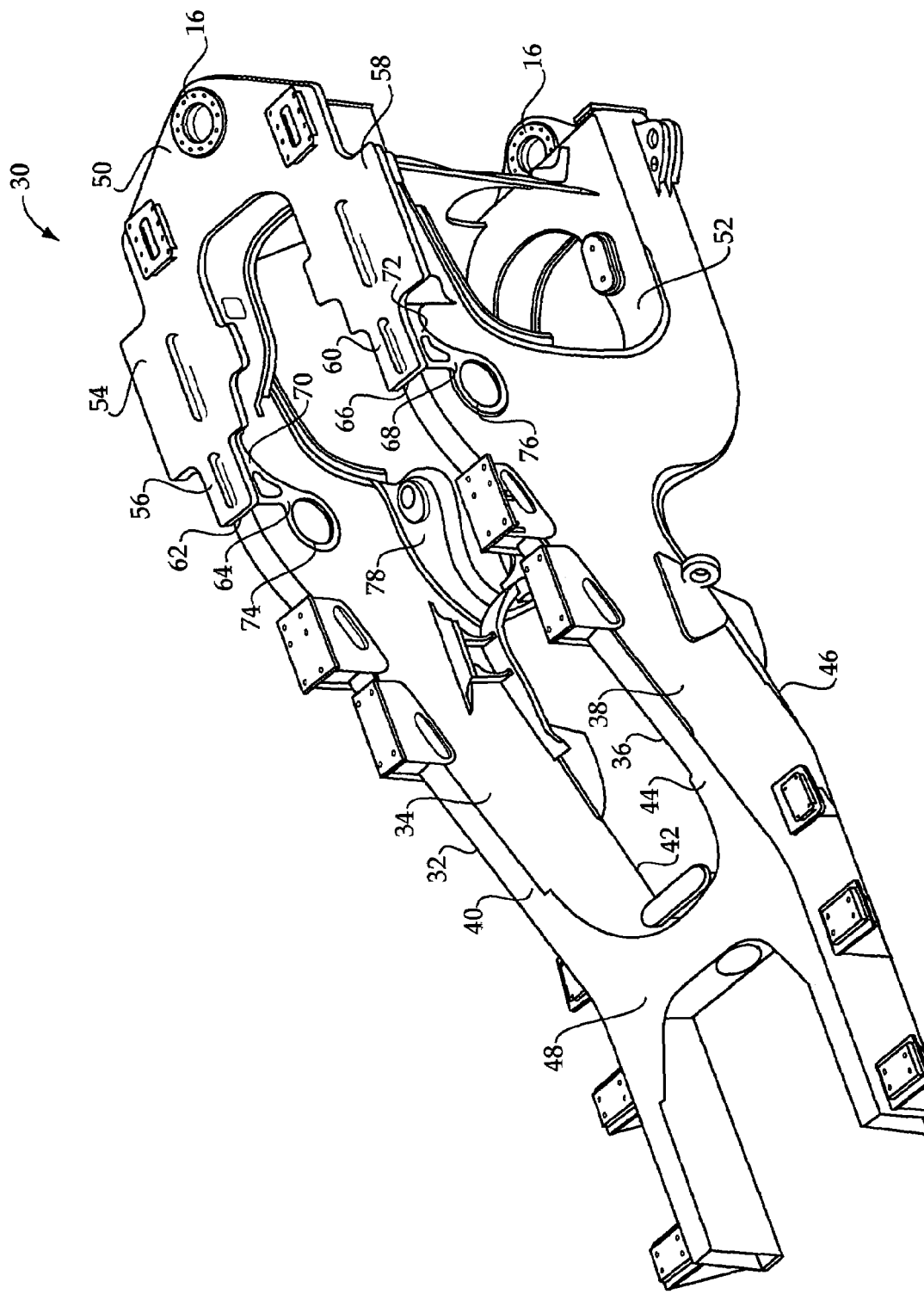
FIG. 2 is a side diagrammatic view of a rear frame assembly of the machine of FIG. 1.

The rear frame assembly includes a metallic structure, such as, a box frame structure 30, shown generally in FIG. 2. The box frame structure 30 includes a first pair of vertical side plates 32 and 34 and a second pair of vertical side plates 36 and 38, all of which are substantially parallel. The first pair of side plates 32 and 34 and the second pair of side plates 36 and 38 are oriented in a longitudinal direction with respect to a centerline of the machine 10, and are spaced apart from one another a predetermined distance. Side plates 32 and 34 are connected at a top portion thereof by a horizontal top plate 40 and at a bottom portion thereof by a horizontal bottom plate 42. Side plates 36 and 38 are connected at a top portion thereof by a horizontal top plate 44 and at a bottom portion thereof by a horizontal bottom plate 46. At least one horizontal member, such as, for example, top members 48 or 50, connects the first pair of side plates 32 and 34 to the second pair of side plates 36 and 38. Top member 50 includes a top portion of the articulation joint 16. An additional horizontal member, such as, for example, bottom member 52, may also connect the first pair of side plates 32 and 34 to the second pair of side plates 36 and 38, and may include a bottom portion of the articulation joint 16. The box frame structure 30 is constructed of steel, or any other suitable material, and may be rolled, formed, shaped, drawn, extruded, forged, cast, fabricated, or otherwise similarly processed. The box frame structure 30 defines a relatively hollow frame structure for supporting various components of the machine 10.

A rigid metallic structure, such as, first horizontal support plate 54 is disposed adjacent a top portion of top plate 40 and may include a narrow portion 56. Another rigid metallic structure, such as, second horizontal support plate 58 is disposed adjacent a top portion of top plate 44 and may include a narrow portion 60. The support plates 54 and 58 provide a solid base on which the ROPS is mounted, and may extend from top member 50 or be rigidly connected to the top member by a weld, adhesive, fastener, or any other known connection. If a lateral force is introduced to the ROPS, the force or load is transferred from the ROPS to the box frame structure 30 through the support plates 54 and 58. The plates 54 and 58 are, therefore, substantially thick in order to provide a solid connection between the ROPS and the box frame assembly 30. Each support plate 54 and 58 may, for example, be at least about 2 inches thick.

A first pair of diffuser plates 62 and 64 extend downwardly from the support plate 54 and along a plane parallel to a plane of the two side plates 32 and 34. Specifically, the diffuser plates 62 and 64 may extend downwardly from the narrow portion 56 of support plate 54. A second pair of diffuser plates 66 and 68 extend downwardly from the narrow portion 60 of support plate 58. Although the diffuser plates 62, 64, 66, and 68 extend downwardly from the narrow portions 56 and 60, it should be appreciated that the diffuser plates may extend downwardly in parallel planar contact from any portion of the support plates 54 and 58.

First ends, such as, for example 70 and 72, of diffuser plates 64 and 68 are attached to support plates 54 and 58, respectively. The attachment is relatively rigid and may include a linear weld or any other secure connection using alternative welds, bolts, adhesives, or fasteners, etc. Alternatively, each pair of diffuser plates 62, 64 and 66, 68 may be cast together with respective support plates 54 and 58 and, therefore, not require the linear welds. Yet alternatively, as an example, diffuser plates 62 and 64 and support plate 54 may be cut as one integral piece, such as, by a laser process. The diffuser plates 62 and 64 may then be folded into engagement with the side plates 34 and 38 during assembly, also eliminating the need for linear welds between the diffuser plates and support plate 54. Second ends, such as, for example 74 and 76, of diffuser plates 64 and 68 are attached to side plates 34 and 38, at side portions thereof. This attachment is also relatively rigid and may include a continuous weld, i.e., a weld that does not have a start and an end. A continuous weld may be preferred since such welds are less likely to crack than interrupted welds. Alternatively, however, a relatively rigid attachment may be achieved by using alternative welds, bolts, adhesives, or fasteners, etc. Welding, as should be appreciated by one skilled in the art, may refer to any known welding process, such as, for example, arc welding, gas welding, resistance welding, energy beam welding, or solid state welding. It should also be appreciated that diffuser plates 62 and 66 may be similar to diffuser plates 64 and 68. Alternatively, however, diffuser plates 62 and 66 may differ in shape and design from diffuser plates 64 and 68.

Although the box frame structure 30 is not flexible per se, it is relatively flexible with respect to the support plates 54 and 58. As a load or force is applied to the box frame structure 30, it is subject to deflection or bending. Although this deflection may be so small as to be imperceptible to the human eye, it is large relative to the deflection or distortion of the support plates 54 and 58. Therefore, although the box frame structure 30 is certainly stiff, it may be fairly characterized as flexible relative to the support plates 54 and 58. The relatively thin and flexible structure of the diffuser plates 62, 64, 66, and 68 allows the respective support plates 54 and 58 to sway in a substantially horizontal direction with respect to the first pair of side plates 32 and 34 and the second pair of side plates 36 and 38 in response to this deflection or bending. Although not necessarily, the support plates 54 and 58 may have a thickness greater than a thickness of the side plates 32, 34, 36, and 38, which may have a thickness greater than a thickness of the diffuser plates 62, 64, 66, and 68.

Figure 3:
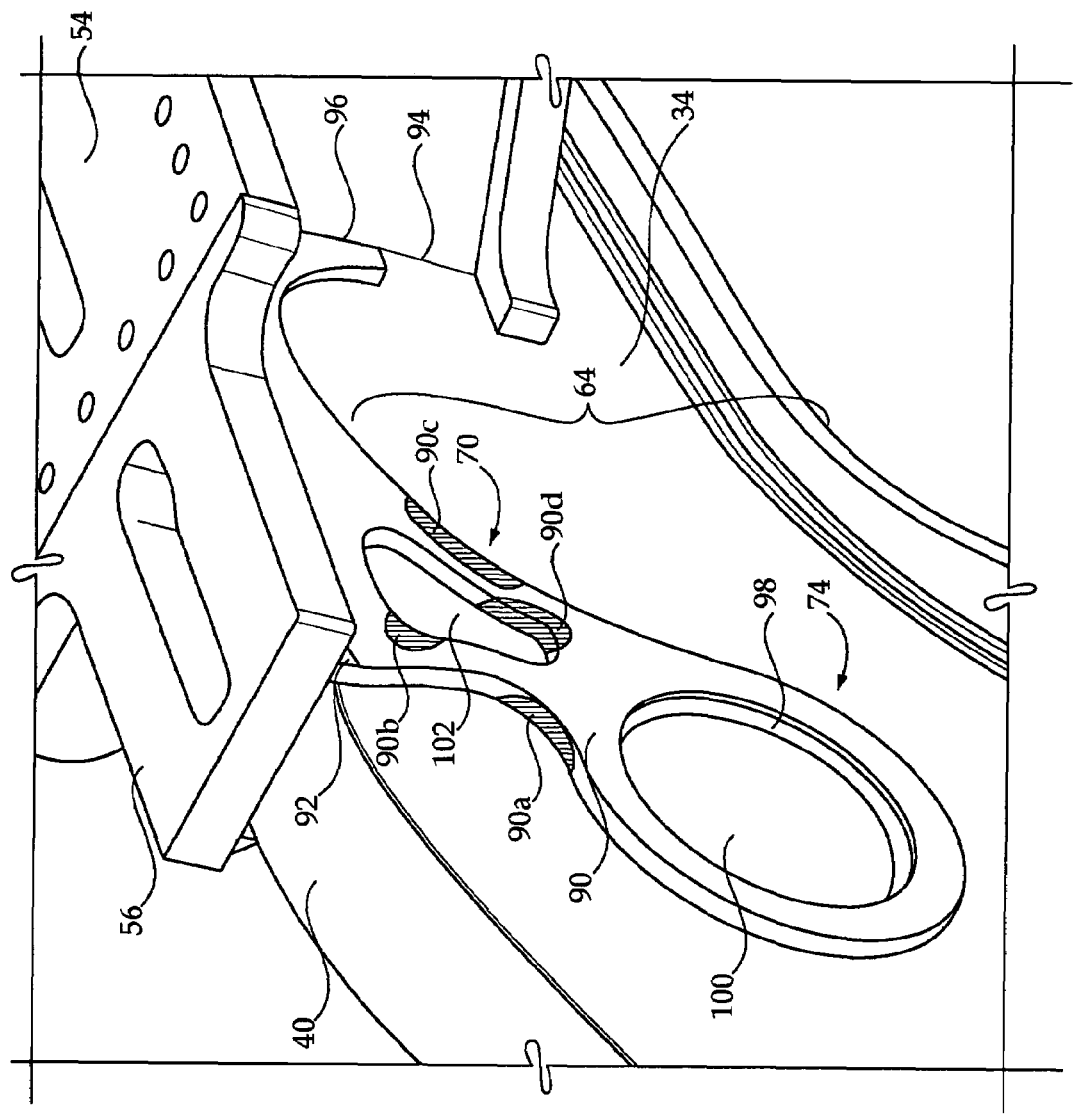
FIG. 3 is a side diagrammatic view of a diffuser plate according to the present disclosure.

Diffuser plate 64 is shown in greater detail in FIG. 3. Diffuser plate 64 includes first end 70 and second end 74 on opposing sides of a stress carrying region 90. It should be appreciated that the stress carrying region 90 refers generally to the area between the first end 70 and the second end 74. Stress may be concentrated in one or more specific areas of the stress carrying region 90, such as, for example 90a, 90b, 90c, and 90d. The first end 70 is attached to a structure that is relatively rigid, such as, for example, narrow portion 56 of support plate 54, at an attachment that is relatively rigid. The relatively rigid attachment may include a linear weld 92. The first end 70 of the diffuser plate 64 may extend along the side plate 34 and may be rigidly attached to a joint 94 of the side plate at an additional linear weld 96. The second end 74 is attached to a low stress area of a structure that is relatively flexible, such as, for example, side plate 34 of box frame structure 30, at an attachment that is also relatively rigid. The relatively rigid attachment may include a continuous weld 98.

The stress carrying region 90 is relatively flexible with respect to the welds 92, 96, and 98. More specifically, characteristics of the stress carrying region 90, such as, for example a thickness, shape, and length of the stress carrying region, relative to characteristics of the welds 92, 96, and 98, such as, for example, continuity, length, and location, help define the relative flexibility of the stress carrying region. So, even though the stress carrying region 90 is also certainly stiff, it may be fairly characterized as flexible relative to the welds 92, 96, and 98. A stress produced from a flexing of the box frame structure 30 relative to the support plate 54 is concentrated within the stress carrying region 90 and, more specifically, within stress areas 90a-90d. The low stress area to which the second end 74 is rigidly attached may be side plate 34, as shown, or any other area that is not subject to extreme stress during movement of the machine 10.

The diffuser plate 64 may have a substantially uniform thickness, and may include a first cutout portion 100 adjacent an interior portion of the continuous weld 98. The diffuser plate 64 may also include one or more additional cutout portions, such as, for example, a second cutout portion 102. The second cutout portion 102 may be located in the stress carrying region 90 of the diffuser plate 64. Stresses produced from a flexing of the box frame structure 30 relative to the support plate 54 may be concentrated at one or more locations adjacent or in close proximity to the second cutout portion 102. The diffuser plate 64 may be constructed of steel, or any other suitable rigid material, and, as described, has a relatively thin and flexible structure. The diffuser plate 64 may have a thickness around about 20 millimeters, or any other useful thickness. Preferably, the diffuser plate 64 has a rounded structure, wherein each curve of the plate has a substantially large radius. Although a specific embodiment is shown, a diffuser plate of varying dimensions is also contemplated. As one example, second end 74 may be positioned at a closer distance or a farther distance from the top plate 40.

INDUSTRIAL APPLICABILITY

Referring to FIGS. 1-3, articulated machine 10 includes a front frame assembly 12 pivotally mounted to a rear frame assembly 14 at an articulation joint 16. Steering for the machine 10 is facilitated through the use of steering cylinders, such as, for example, hydraulic steering cylinder 24. Steering cylinders have first ends connected to the front frame assembly 12 and second ends connected to the rear frame assembly 14. As an example, a second end of a steering cylinder may be mounted to the box frame structure 30 of the rear frame assembly 14 at a steering cylinder mounting portion 78. The steering cylinders extend and contract to articulate the front frame assembly 12 with respect to the rear frame assembly 14, as is well known in the art.

The box frame structure 30 also includes a first pair of vertical side plates 32 and 34 and a second pair of vertical side plates 36 and 38. Side plates 32 and 34 are connected at a top portion thereof by a horizontal top plate 40 and at a bottom portion thereof by a horizontal bottom plate 42. Side plates 36 and 38 are connected at a top portion thereof by a horizontal top plate 44 and at a bottom portion thereof by a horizontal bottom plate 46. At least one horizontal member, such as, for example, top members 48 or 50, connects the first pair of side plates 32 and 34 to the second pair of side plates 36 and 38. Top member 50 includes a top portion of the articulation joint 16. An additional horizontal member, such as, for example, bottom member 52, may also connect the first pair of side plates 32 and 34 to the second pair of side plates 36 and 38, and may include a bottom portion of the articulation joint 16.

A first horizontal support plate 54 is disposed adjacent a top portion of the top plate 40 and a second horizontal support plate 58 is disposed adjacent a top portion of the top plate 44. The support plates 54 and 58 provide a solid base on which the ROPS is mounted. In conventional assemblies, the support plates 54 and 58 are welded directly to the top plates 40 and 44.

During a normal duty cycle of the machine 10, the steering cylinders are continually extended and retracted. Large steering forces due to this continual movement result in repetitive flexing of the box frame structure 30 with respect to the ROPS support plates 54 and 58 mounted thereon. These cyclic stresses, concentrated at a welded joint connecting the box frame structure 30 and the ROPS plates 54 and 58, may reduce the fatigue life and ultimately lead to failure of the welded joint.

The box frame structure 30 according to the present disclosure may be utilized to reduce such failures. Diffuser plates 62, 64, 66, and 68 indirectly connect support plates 54 and 58 to the box frame structure 30 and are configured to concentrate stress produced from a flexing of the box frame structure relative to the support plates within stress areas 90a-90d thereof. The relatively thin and flexible structure of the diffuser plates 62, 64, 66, and 68 allows the support plates 54 and 58 to sway in a substantially horizontal direction with respect to the side plates 32, 34 and 36, 38 in response to deflection or bending of the box frame structure 30. The welds, such as, for example, welds 92, 96, and 98, connecting the diffuser plates 62, 64, 66, and 68 to the support plates 54 and 58 and box frame structure 30 are located at low stress areas and are, therefore, not subject to high rates of failure. In addition, the large radius curvature and lack of sharp corners in each diffuser plate 62, 64, 66, and 68 help avoid stress concentration regions that could lead to cracks.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A machine having a ground engaging element, comprising:
    a first rigid metallic structure positioned at a first vertical location relative to the ground engaging element;
    a second metallic structure that is flexible with respect to the first rigid metallic structure and positioned at a second vertical location relative to the ground engaging element;
    a diffuser plate having a first end and a second end and coupling the first rigid metallic structure with the second metallic structure, the diffuser plate having a generally vertical orientation and including a stress carrying region extending from the first end to the second end, wherein the first end has a rigid attachment to the first metallic structure, the second end has a rigid attachment to the second metallic structure, and the stress carrying region is flexible with respect to the attachments; and
    wherein a stress produced from a flexing of the second metallic structure relative to the first metallic structure is concentrated within the stress carrying region, and wherein the first rigid metallic structure is movable in a horizontal direction, via flexing of the diffuser plate, responsive to deflecting or bending of the second metallic structure.

2. The machine of claim 1, wherein the first metallic structure includes a plate and the second metallic structure includes a box frame structure.

3. The machine of claim 2, wherein the plate is a rollover protection system support plate and the box frame structure includes an articulation joint.

4. The machine of claim 3, wherein the box frame structure includes an engine-end frame of an articulated wheel loader.

5. The machine of claim 1, wherein the diffuser plate has a substantially uniform thickness.

6. The machine of claim 1, wherein the attachment of the first end and the first metallic structure includes a linear weld, and the attachment of the second end and the second metallic structure includes a continuous weld.

7. The machine of claim 6, wherein the diffuser plate includes a first cutout portion adjacent an interior portion of the continuous weld.

8. The machine of claim 7, wherein the diffuser plate includes a second cutout portion in the stress carrying region.

9. A machine having a ground engaging element, comprising:
a first rigid metallic structure;
a second metallic structure that is flexible with respect to the first rigid metallic structure;
a diffuser plate having a stress carrying region located between a first end and a second end, wherein the first end has a rigid attachment to the first metallic structure, the second end has a rigid attachment to the second metallic structure, and the stress carrying region is flexible with respect to the attachments;
wherein a stress produced from a flexing of the second metallic structure relative to the first metallic structure is concentrated within the stress carrying region;
wherein the first metallic structure includes a plate and the second metallic structure includes a box frame structure;
wherein the plate is a rollover protection system support plate and the box frame structure includes an articulation joint; and
wherein the rollover protection system support plate is thicker than a plate of the box frame structure, which is thicker than the diffuser plate.

10. A method of assembling a machine, comprising:
attaching a first end of a diffuser plate to a first rigid metallic structure at a rigid attachment positioned at a first vertical location;
attaching a second end of the diffuser plate to a low stress area of a second metallic structure at a rigid attachment positioned at a second vertical location, wherein the second metallic structure is flexible with respect to the first rigid metallic structure; and
wherein the diffuser plate includes a stress carrying region that is flexible with respect to the attachments and extends from the first end to the second end for concentrating stress produced from a flexing of the second metallic structure relative to the first metallic structure; and
wherein the first rigid metallic structure is movable in a horizontal direction, via flexing of the diffuser plate, responsive to deflecting or bending of the second metallic structure.

11. The method of claim 10, wherein the first attaching step includes attaching the first end to the first metallic structure with a linear weld.

12. The method of claim 10, wherein the second attaching step includes attaching the second end to the second metallic structure with a continuous weld.

13. The method of claim 10, further including forming the stress carrying region of the diffuser plate to define a cutout portion.

14. A frame assembly of a machine, comprising:
a box frame structure including at least two parallel plates, the at least two parallel plates defining first and second planes;
a support plate disposed adjacent a top portion of the parallel plates and oriented perpendicularly thereto; and
at least one diffuser plate extending along a third plane parallel to the first and second planes, wherein a first end of the diffuser plate has an attachment to the support plate and a second end of the diffuser plate has an attachment to the box frame structure;
wherein the attachment of the first end of the diffuser plate to the support plate includes a rigid attachment and the attachment of the second end of the diffuser plate to the support plate also includes a rigid attachment, each of the rigid attachments having a relatively lesser flexibility; and
wherein the diffuser plate further includes a stress carrying region extending from the first end to the second end, the stress carrying region having a relatively greater flexibility.

15. The frame assembly of claim 14, wherein a stress produced from a flexing of the box frame structure relative to the support plate is concentrated within the stress carrying region of the diffuser plate.

16. The frame assembly of claim 14, wherein the attachment of the first end and the support plate includes a linear weld.

17. The frame assembly of claim 14, wherein the attachment of the second end and the box frame structure includes a continuous weld.

18. A frame assembly of a machine, comprising:
a box frame structure including at least two parallel plates;
a support plate disposed adjacent a top portion of the parallel plates and oriented perpendicularly thereto; and
at least one diffuser plate extending along a plane parallel to a plane of the two parallel plates, wherein a first end of the diffuser plate has an attachment to the support plate and a second end of the diffuser plate has an attachment to the box frame structure;
wherein the attachment of the second end and the box frame structure includes a continuous weld; and
wherein the diffuser plate includes a first cutout portion adjacent an interior portion of the continuous weld.

19. The frame assembly of claim 18, wherein each diffuser plate includes a second cutout portion in the stress carrying region.

\* \* \* \* \*